United States Patent Office 2,996,901
Patented Aug. 22, 1961

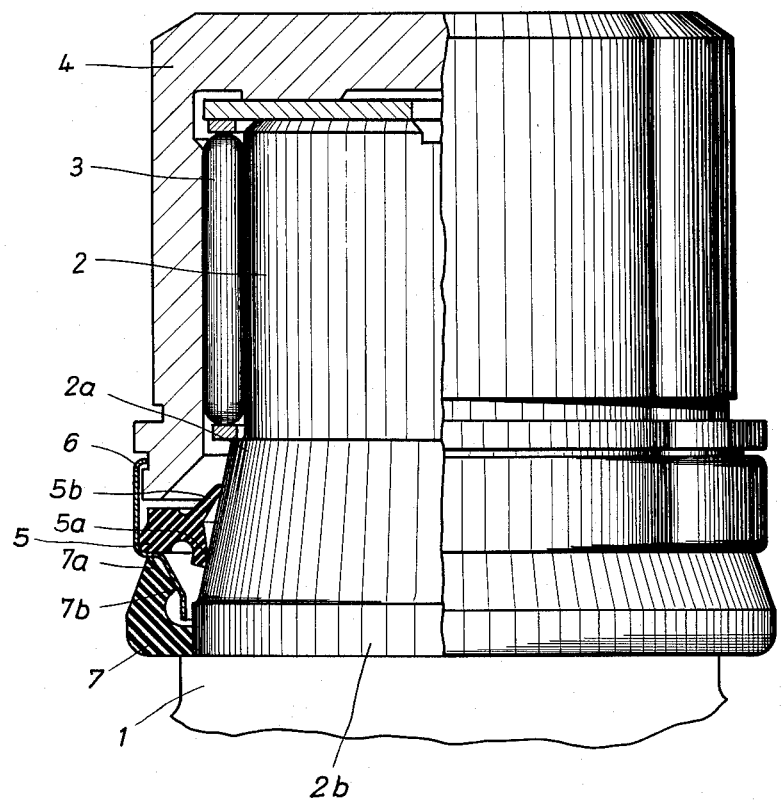

2,996,901
ARRANGEMENT FOR SEALING THE STUDS OF UNIVERSAL JOINT SHAFTS AND THE LIKE
Hans-Joachim Kleinschmidt, Essen, Germany, assignor to Gelenkwellenbau G.m.b.H., Essen, Germany
Filed Jan. 25, 1960, Ser. No. 4,266
Claims priority, application Germany Jan. 27, 1959
2 Claims. (Cl. 64—17)

The present invention relates to a sealing arrangement for studs of universal joint shafts and the like, especially for rolling mills with water cooling.

It has been suggested heretofore, for purposes of sealing the cross-joints or universal joints of universal shafts, to employ a sealing ring of elastic material and to arrange such sealing ring on a conical extension of the stud. Experience has shown that such a sealing system is still insufficient, especially with drives for rolling mills. It is to be noted that in such instances, the joints are heated considerably by radiation and are strongly cooled by water after the rolled stock has past through the mill. As a result thereof, water can still be drawn into the bearing in spite of the provision of a double seal, which water will in a relatively short time destroy the bearings, especially needle bearings.

It is, therefore, an object of the present invention to provide an improved sealing system for the studs of universal joint shafts and the like, which will overcome the above-mentioned drawbacks.

It is a further object of this invention to provide a sealing system for sealing the studs of universal joint shafts and the like, especially for rolling mills with water cooling, which will assure a satisfactory sealing of the bearings.

These and other objects and advantages of the invention will appear more clearly from the following specification in connection with the accompanying drawing illustrating, partly in section and partly in view, a sealing system according to the invention.

The sealing system according to the invention is characterized primarily in that in addition to the double-lip seal resting on the cone-shaped extension of the stud, the stud is provided with an additional sealing ring. The additional sealing ring may be arranged in a fixed manner upon a cylindrical portion of the stud while two lips of said sealing ring rest against the holding means of said double-lipped sealing ring. Such a double sealing system will also with heavy duty rolling mill drives, assure a sufficient sealing of the bearings.

Referring now to the drawing in detail, the stud cross or universal joint 1 is in customary manner provided with four studs 2 (one only being shown) which are journalled in the cross-joint housing 4 by means of needles 3. The said studs 2 have a conical extension 2a upon which acts a sealing ring 5 made in customary manner of elastic material as, for instance rubber or any suitable synthetic materials.

This sealing ring is advantageously provided with two lips 5a and 5b although, if desired, more than two lips may also be employed. Inasmuch as the two lips 5a and 5b act upon different diameters of the extension 2a, they will also have a different sliding speed, which is advantageous for the sealing.

The sealing ring 5 is held by a holding ring 6 which engages a groove or depression in housing 4.

For purposes of additionally sealing the stud of the universal joint shaft, according to the present invention, an additional sealing ring 7 is provided which is firmly mounted on the cylindrical portion 2b of stud 2. This sealing ring may also be equipped with two lips 7a and 7b which rest against the holding ring 6 to bring about an additional sealing effect.

It is, of course, to be understood that the present invention is, by no means, limited to the particular construction shown in the drawing but also comprises any modifications within the scope of the appended claims.

What I claim is:
1. A sealing arrangement for trunnions of a universal joint: a trunnion having a first section, a housing surrounding the end portion of said trunnion including said first section, said trunnion having a second section flaring outwardly away from said first section and protruding from said housing, a multi-lip ring sealingly engaging said second section, said trunnion also comprising a third section having a substantially cylindrical contour and being connected to said second section, a holding ring having one portion in engagement with said housing and having another portion in engagement with and extending around said multi-lip ring, and an additional ring sealingly engaging said third section and resting in a sealing manner on said holding ring along spaced circular peripheral lines thereof.

2. In combination: a stud having a first section, a housing surrounding the end portion of said stud including said first section, said stud having a second section flaring outwardly away from said first section and protruding from said housing, a multi-lip ring sealingly engaging said second section outside said housing, said stud also comprising a third section having a substantially cylindrical contour and being connected to said second section, a holding ring having one end portion in engagement with said housing and having its other end portion extending into the neighborhood of said third section while surrounding said multi-lip ring, and an additional ring sealingly engaging said third section and resting on said holding ring along spaced circular peripheral lines thereof.

References Cited in the file of this patent

UNITED STATES PATENTS

| | | |
|---|---|---|
| 2,255,604 | Warner | Sept. 9, 1941 |
| 2,896,433 | Hemple | July 28, 1959 |